Dec. 1, 1936.   J. KEULERS   2,062,910
PROCESS FOR THE MANUFACTURE OF THIN WALLED LIGHT CONTAINERS
Filed May 31, 1933   3 Sheets-Sheet 1

INVENTOR.
J. Keulers
BY:
Glascock Downing Seebold
ATTORNEYS.

Dec. 1, 1936. J. KEULERS 2,062,910
PROCESS FOR THE MANUFACTURE OF THIN WALLED LIGHT CONTAINERS
Filed May 31, 1933 3 Sheets-Sheet 2
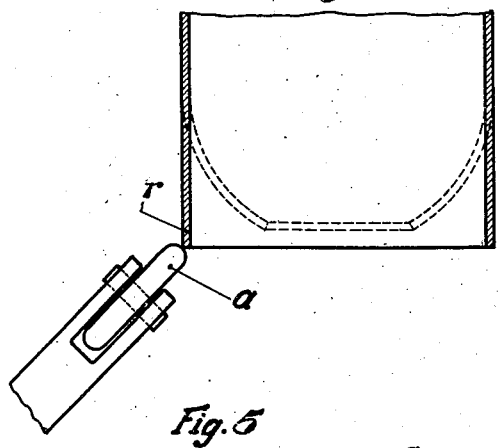
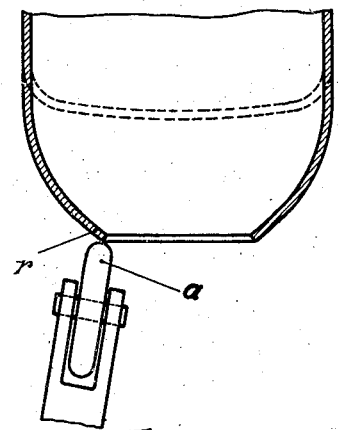
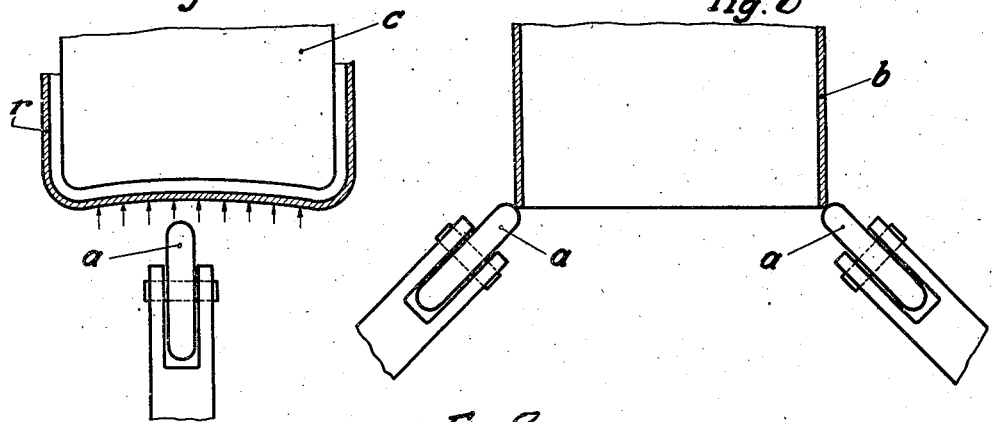
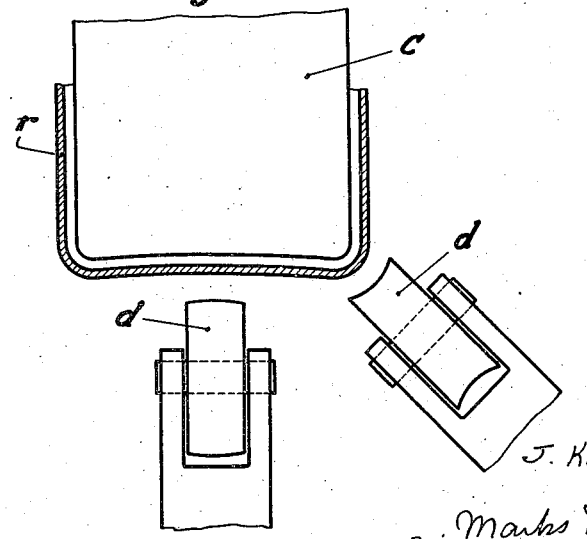
J. Keulers
INVENTOR
By: Marks & Clerk
Attys.

Dec. 1, 1936.    J. KEULERS    2,062,910
PROCESS FOR THE MANUFACTURE OF THIN WALLED LIGHT CONTAINERS
Filed May 31, 1933    3 Sheets-Sheet 3
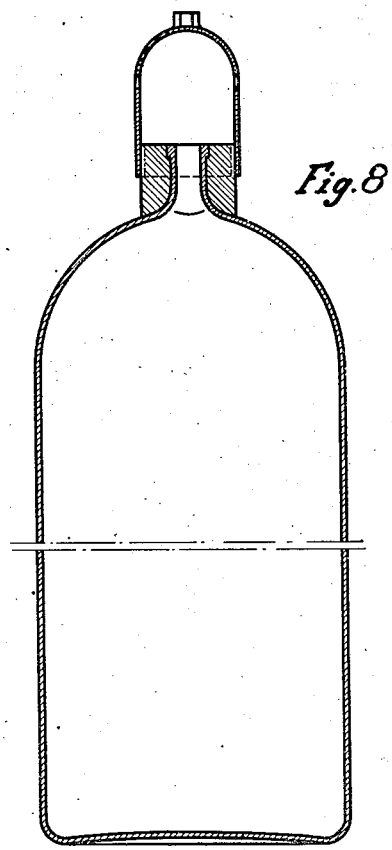
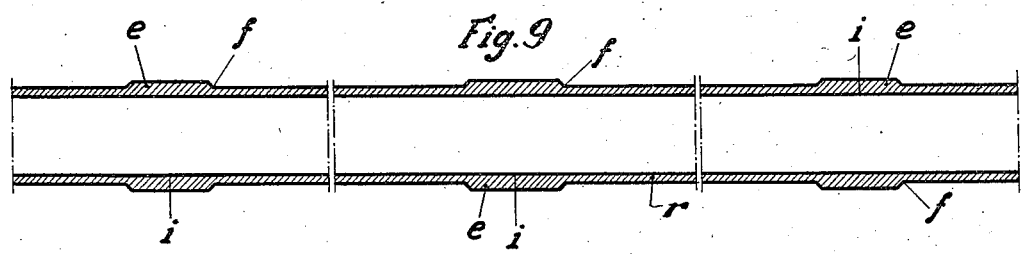
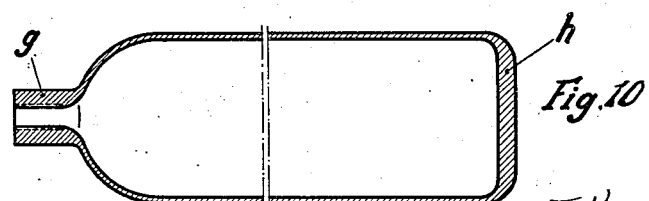
J. Keulers
INVENTOR
By: Marks & Clerk
Attys.

Patented Dec. 1, 1936

2,062,910

UNITED STATES PATENT OFFICE 2,062,910

PROCESS FOR THE MANUFACTURE OF THIN-WALLED LIGHT CONTAINERS

Jakob Keulers, Hilden, Germany, assignor to Vereinigte Stahlwerke Aktiengesellschaft, Dusseldorf, Germany Application May 31, 1933, Serial No. 673,788
In Germany December 27, 1932

6 Claims. (Cl. 29—148.2)

It is known to manufacture seamless containers and carboys for gaseous and liquid mediums or to compose such containers by welding together of metal sheets. The thickness of the wall of such tubes is adjusted in accordance with the laws of the strength science and the official or other rules which have to be taken into consideration, taking as a basis the pressure which will occur in the container or carboy; the minimum wall thickness of seamless containers depends from the manner of manufacture and that of welded containers from the aptitude of the working material to be welded. In consequence thereof the calculated wall thickness, especially for low and moderate pressures is remarkably lower than it must be chosen on account of the manner of manufacture and of the aptitude of the working material.

The same is true with respect to the establishment of the neck and of the bottom which are formed in the case of thin-walled containers of sheet metal pieces which are connected to the tubes by means of circular welding seams.

The present invention enables the manufacture and the utilization of containers and carboys for small or moderate pressures without longitudinal and circular seams, the walls of which are as thin as corresponds to the calculation, whereas for the reasons above explained, the containers hitherto used for the same purpose must be manufactured with considerably thicker walls on account of the manner of manufacture of the tubes, the working of the tube ends for the neck and bottom, the aptitude of the working material and the longitudinal and circular welding seams.

The containers manufactured in accordance with the present invention are not only cheaper than those prior used, because of the saving of working material, but they also work in a more economical manner in consequence of their smaller weight. They require low freight charges in the case of transportable carboys for instance, and their handling is more economical.

In accordance with the present invention a seamless tube is produced by rolling, pressing or drawing. Said tube is flared or expanded to a larger diameter, whereby it receives a smaller wall thickness. Thereupon the bottom and the neck of the container are formed from the working material forming the tube. The flaring operation is effected in such a manner that the diameter of the tubes is increased to about 160% of the original diameter, depending upon the required wall thickness of the carboys. For instance the flaring or expanding is effected by means of mandrels, the diameter of which is larger than the free width of the tubes, in such a manner that one or several mandrels are fixed upon a bar and are drawn through the tube. With special advantage for this purpose the process described and claimed in the prior U. S. A. patent application Serial Number 671,580 filed May 17, 1933 is used.

It is also possible to manufacture in this manner containers or carboys with a cross section other than circular. For this purpose the mandrels are profiled in a suitable manner.

The invention moreover is based upon the fact that the establishment of the neck and the bottom at tubes intended for thin-walled carboys can be effected in accordance with the usual pressing or forging operation only with great difficulties which causes unfavourable folds. The seamless carboys must therefore have thinner walls or the bottom and the neck must be connected by welding as in the known welded constructions.

In accordance with the present invention both parts are established by ramming in such a manner that the tube is locally and gradually heated during a quick rotating movement in a turning lathe or another suitable machine. By means of profiled rollers or rolls they are rammed into the desired shape. This ramming is preferably carried out at the one side upon a mandrel inserted into the tube, the end of which is shaped according to the shape of the neck and the bottom respectively.

By flaring the tube to such a high degree as provided for by the present invention, the wall of the tube does not only suffer a reduction of cross section, but the material is simultaneously subjected to an extreme proofing test. The proofing test was heretofore effected by pressing off the flanges by means of water and by technological tests, as prescribed by the official rules and that of classification companies. Such a proof however does not make evident such faults which become effective only after a certain time of operation due to a great number of unfavourable stresses to which the containers are subjected. At this late time such faults may cause a destruction of the container and in consequence thereof grave accidents.

If the tubes are flared in accordance with the present invention the working material is subjected to extreme stresses as in no other test proof. By this examination even the slightest faults of material or manufacture become clearly perceptible. It is thereby possible either to remove such faults or to eliminate the defective tube from the further operation. In this manner it is possible to manufacture containers and carboys which are absolutely safe in use.

A further improvement can be obtained according to the present invention by forming on the seamless tube local strengthenings from which the neck of the bottle may be formed. Thereby it is possible immediately to manufacture the part forming the neck of the container with a wall thickness sufficient for the manufacture of the internal or external thread or of an internal and external thread. Otherwise this would only be possible by welding special flanges upon the tube.

The strengthening parts may be provided at the interior or at the exterior part of the tube or at both places. They can be obtained during the manufacture of the seamless tube by means of rolling, for instance in such a manner, that the rolls are caused to move upwards, ("auffahren") when they pass over that part of the tube which shall be provided with a strengthening so that the distance of the rolls is altered.

With special advantage the invention can be carried out by producing a seamless tube with several local strengthened parts and separating said tube into several sections from which the several containers may be produced. The thickened portions of the tubes forming the original blank can be shaped in such a manner, and the tubes may be divided in such a manner, that the bottom of the container receives also a strengthened portion. This may be of advantage especially in cases in which a working of the bottom is necessary.

The containers produced in accordance with the present invention are not only cheap on account of saving material, but they are also more economical in the operation due to their smaller weight. In consequence thereof a preferred embodiment of the invention consists in using the containers manufactured in the described manner for the reception of mediums of moderate and low pressure, more particularly as transportable bottles.

The invention will be more clearly illustrated by way of examples with reference to the accompanying drawings.

Figure 1:
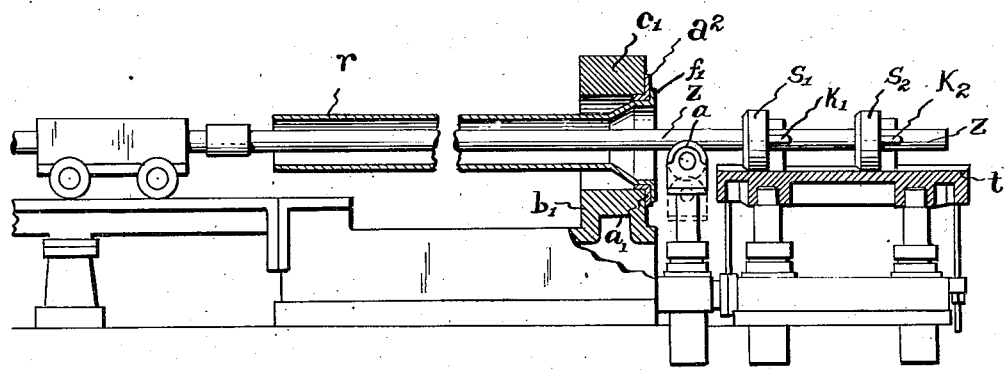
Fig. 1 shows a longitudinal section of a flaring device according to the prior application which may preferably be used for the flaring step of the method according to the present invention.
Figure 2:
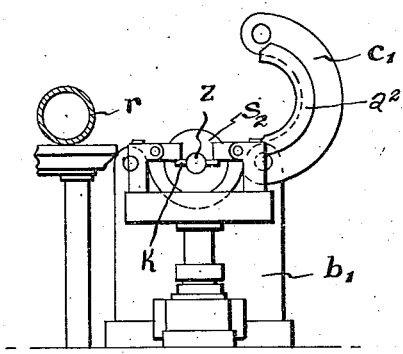
Fig. 2 is a side elevation according to Fig. 1.

Fig. 3 schematically shows the first part of the ramming operation.

Fig. 4 shows the flat pressing of the bottom of the container.

Fig. 5 shows the final shaping of the bottom of the container.

Fig. 6 shows a modified arrangement of pressing rollers.

Fig. 7 is a further modification of the rollers.

Fig. 8 shows an embodiment of a container manufactured according to the present invention.

Fig. 9 shows a seamless tube provided with local strengthened portions.

Fig. 10 shows a finished container.

The flaring device or draw bench is provided with an abutment block carrying a draw plate $a_1$, $a_2$ divided on the plane of the axis. The half member $a_1$ of the draw plate is disposed in the lower fixed part of the abutment $b_1$ and the other half $a_2$ can swing with the top of the abutment $c$ about the axis $d$ parallel to the central axis. The tube $r$ broached at its end to the desired diameter by an upsetting pressed and provided with the flange $f_1$ and having previously been brought to drawing temperature is rolled from the side into the drawing frame whose upper half is turned up so as to be adjacent with the flange $f_1$ to the lower half of the draw plate $a_1$, $a_2$, whereupon the top half $c_1$ of the frame is turned down together with the upper half $a_2$ of the draw plate. The conical drawing plugs $s_1$, $s_2$ with increasing outer diameter are ready and disposed on a table before the abutment block. They possess a bore through which the drawing rod $z$ is pushed, and after the latter has been passed through these bores, the plugs $s_1$, $s_2$ are connected with the rod $z$ by the wedges $k_1$, $k_2$ and on the return drawn through the tube $r$ in one operation or singly. When the desired extent of flaring has been attained, the top of the abutment block is turned up and the tube removed from the device.

Figs. 3-5 schematically show the ramming of the tube ends. Fig. 3 shows the first part of said operation in which the roller $a$ inserted into the support, presses off the end of the tube $r$ into the interior.

Fig. 4 shows the flat pressing of the bottom and Fig. 5 the final shaping of the bottom upon the mandrel $c$ inserted into the tube. The roller $a$ is rotatably and movably mounted so that it can be arranged in any desired position with respect to the longitudinal and transverse axis of the tube $r$. Thereby and due to a suitable profilation of the roller $a$, it is possible to obtain any desired shape for the bottom and the neck.

Instead of one roller $a$ it is possible to arrange several rollers either behind each other in the longitudinal direction of the tube or in opposite direction at both sides of the tube. This latter arrangement is shown in Fig. 6.

Fig. 7 shows a further modification in which instead of the rollers $a$ profiled rolls $d$ are used which have a larger pressing face than the roller $a$.

Fig. 8 shows an embodiment of a container manufactured according to the present invention.

Fig. 9 shows a seamless tube $r$ provided with local strengthened portions $e$. This tube is flared to the desired thin wall thickness and separated at the places designed by $f$ into several sections, from each of which one container is to be formed. Thereupon the neck and the bottom of each container are formed by ramming the wall of the tube in the described manner. The strengthened portions $e$ are shaped into the neck portion of the container.

In Figure 10 the neck portion of the finished container $g$ is strengthened so that it delivers sufficient material for the interior and exterior threads, depending upon the manner of the used closing cap and of the valve, and yet possesses still a certain minimum wall thickness. If the bottom $h$ is also to be strengthened, the strengthened portion of the tube wall is made of the required length and is separated at the places $i$, so that the strengthened portions can be used at the one side for the neck portion and at the other side for the bottom.

What I claim and desire to secure by Letters Patent of the United States is:

1. Process for the manufacture of thin-walled light containers such as carboys, which consists in flaring a seamless tube to a larger outer diameter whereby the wall thickness is also diminished to the desired extent, and in a further shaping of the flared tube at the ends to a container with a smaller wall-thickness than was hitherto obtainable.

2. Process for the manufacture of thin-walled light containers such as carboys, which consists in drawing several mandrels of increasing diameter, which are secured on a bar, through the tube, the tube being flared to a larger outer diameter and its wall-thickness diminished to the desired extent, and in a further shaping of the flared tube at the ends to a container.

3. Process for the manufacture of thin-walled light containers such as carboys, which consists in drawing several mandrels of non-circular cross section of increasing diameter, which are secured on a bar, through the tube, the tube being flared to a larger outer diameter and its wall-thickness diminished to the desired extent, and in a further shaping of the flared tube at the ends to a container.

4. Process for the manufacture of thin-walled light containers such as carboys, which consists in flaring a seamless tube, which is provided with several strengthened portions, to a larger outer diameter whereby the wall-thickness is also diminished to the desired extent, and in a further shaping of the flared tube at the ends to a container.

5. Process for the manufacture of thin-walled light containers such as carboys, which consists in flaring a seamless tube, which is provided with several strengthened portions, each of which corresponds to a single container, to a larger outer diameter whereby the wall-thickness is also diminished to the desired extent, and in separating the said tube into several sections and in a further shaping of these sections at the ends to containers.

6. Process for the manufacture of thin-walled light containers such as carboys, which consists in flaring a seamless tube, which is provided with several strengthened portions, each of which corresponds to a single container, to a larger outer diameter whereby the wall-thickness is diminished to the desired extent, and in separating the said tube into several sections and in a further shaping of these sections at the ends to containers, the strengthened portions forming the material for the neck and the bottom of the container.

JAKOB KEULERS.